(12) United States Patent
Martin et al.

(10) Patent No.: US 7,562,850 B2
(45) Date of Patent: Jul. 21, 2009

(54) ELECTRICAL COMPONENT SUPPORT ASSEMBLY

(75) Inventors: Ralph Sykes Martin, Mount Airy, NC (US); Clifford F. Lincoln, III, Atlanta, GA (US)

(73) Assignee: Tyco Electronics Corporation, Middletown, PA (US)

( * ) Notice: Subject to any disclaimer, the term of this patent is extended or adjusted under 35 U.S.C. 154(b) by 70 days.

(21) Appl. No.: 11/807,124

(22) Filed: May 25, 2007

(65) Prior Publication Data

US 2008/0290230 A1    Nov. 27, 2008

(51) Int. Cl.
*A47B 96/06*    (2006.01)
*A47F 7/00*    (2006.01)

(52) U.S. Cl. ............. 248/220.41; 248/220.31; 248/300; 211/49.1; 211/90.01

(58) Field of Classification Search ......... 248/220.41, 248/220.31, 220.42, 220.43, 224.8, 225.21, 248/300, 301, 247; 211/49.1, 90.01
See application file for complete search history.

(56) References Cited

U.S. PATENT DOCUMENTS

| | | | | |
|---|---|---|---|---|
| 2,841,353 | A * | 7/1958 | Burdick ............. | 248/220.21 |
| 4,113,109 | A * | 9/1978 | Donnelli et al. ........... | 211/49.1 |
| 4,163,913 | A * | 8/1979 | Barratt ................ | 310/91 |
| 4,550,893 | A * | 11/1985 | Wiersema et al. ....... | 248/224.8 |
| 6,109,461 | A * | 8/2000 | Kluge et al. ........... | 211/90.01 |
| 6,260,324 | B1 | 7/2001 | Miedema et al. | |
| 6,497,395 | B1 * | 12/2002 | Croker .................. | 248/300 |
| 6,550,875 | B1 | 4/2003 | Compton et al. | |
| 6,663,435 | B2 | 12/2003 | Lincoln, III et al. | |
| 6,684,929 | B2 | 2/2004 | Slager et al. | |
| 6,722,619 | B2 * | 4/2004 | Valiulis et al. ......... | 248/220.31 |
| 7,114,972 | B1 | 10/2006 | Riner | |
| 2003/0201238 | A1 | 10/2003 | Riner | |

* cited by examiner

*Primary Examiner*—Anita M King

(57) ABSTRACT

An electrical component support assembly that includes an electrical component and a bracket removably attached to the electrical component. The bracket is configured to couple to the electrical component and includes a base member that has a first side with a substantially planar shape. The bracket also includes a pair of elbow members that are located proximate to a second side of the base member. The elbow members are configured to be mounted to a support frame. Each of the elbow members is shaped to include a spring portion and a tab joined thereto. The spring portions flex with respect to the base member. The tabs on the pair of elbow members are arranged adjacent to one another and oriented to extend in a substantially common direction to be received in a common hole in the support frame. The tabs extend outward from the spring portions and have recesses for gripping the support frame.

20 Claims, 7 Drawing Sheets

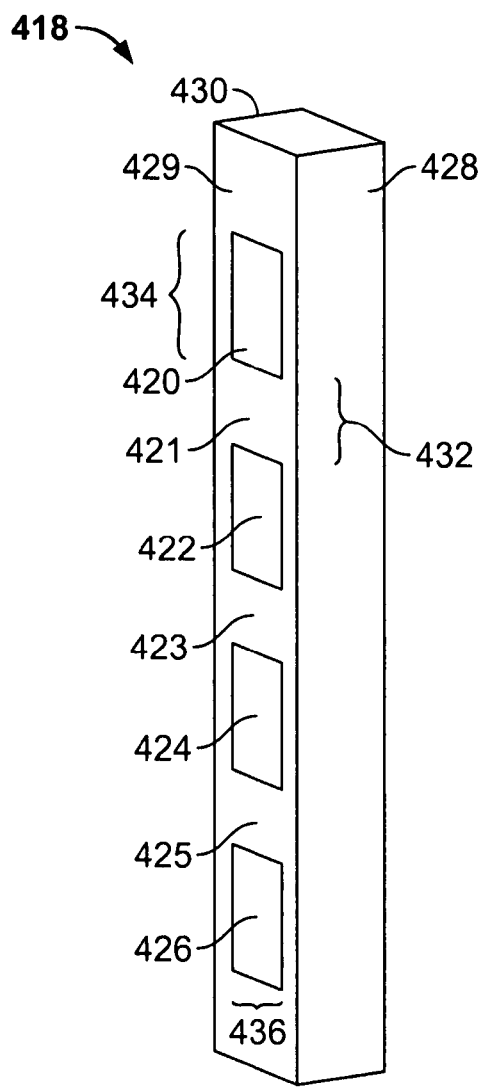
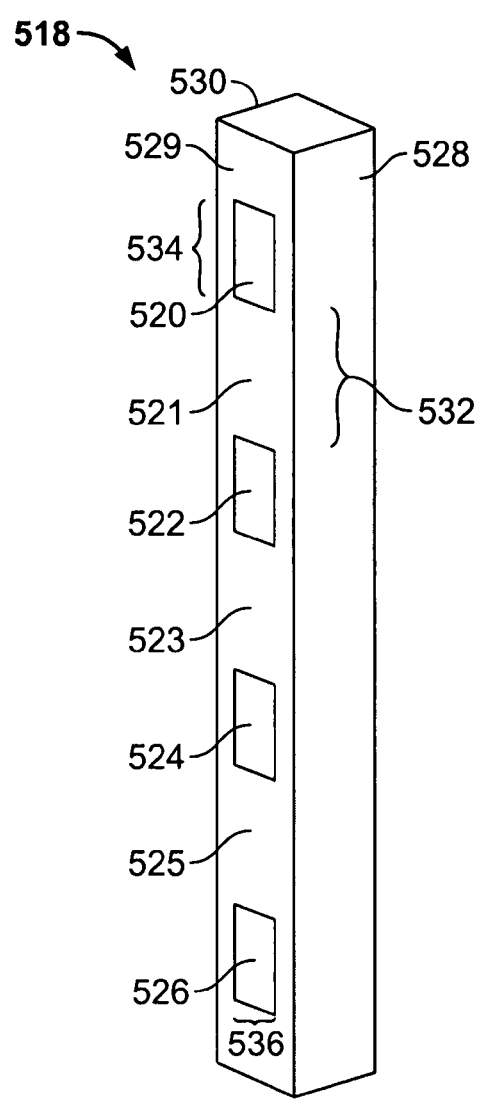
FIG. 5                     FIG. 6

ELECTRICAL COMPONENT SUPPORT ASSEMBLY

BACKGROUND OF THE INVENTION

This invention relates generally to a mounting assembly, and more particularly, to a bracket assembly for mounting an electrical component.

In the industry of retail electronics, businesses often plug electronic products into power outlets so that a consumer may view and/or use the product before deciding whether to purchase the product. But the rapid development and improvements of electronic products cause stores to frequently reconfigure the display of the products. Moreover, stores often change the displays to encourage consumers to purchase certain items and to provide a greater aesthetic appeal for the store.

Although the displays in retail stores are frequently changed, the structure that holds the products are changed less frequently. Nevertheless, store operators would like the ability to move products around the store without having to worry about whether the product can be plugged into an outlet. In one known structure, receptacle outlets are removably attached to wire-frame supports by using brackets that grip the wires. However, these brackets are unable to grip stanchion supports, which have vertical openings along one-side of a rectangular frame. Furthermore, other brackets fail to provide the proper support for power strips having multiple outlets.

Thus, there is a need in the industry for a bracket that supports electrical components and for a bracket that will allow stores to reconfigure product displays without changing or reconfiguring the underlying support system.

BRIEF DESCRIPTION OF THE INVENTION

In one embodiment, a bracket for mounting an electrical component to a support frame is provided. The bracket is configured to couple to the electrical component and includes a base member that has a first side with a substantially planar shape. The bracket also includes a pair of elbow members that are located proximate to a second side of the base member. The elbow members are configured to be mounted to a support frame. Each of the elbow members is shaped to include a spring portion and a tab joined thereto. The spring portions flex with respect to the base member. The tabs on the pair of elbow members are arranged adjacent to one another and oriented to extend in a substantially common direction to be received in a common hole in the support frame. The tabs extend outward from the spring portions and have recesses for gripping the support frame.

Optionally, the spring portions bias the tabs outward away from one another such that the tabs securely grip opposed sides of the common hole in which the tabs are received.

In one embodiment, a support assembly for supporting an apparatus is provided that includes an apparatus and a bracket removably attached to the apparatus. The bracket is configured to couple to the apparatus and includes a base member that has a first side with a substantially planar shape. The bracket also includes a pair of elbow members that are located proximate to a second side of the base member. The elbow members are configured to be mounted to a support frame. Each of the elbow members is shaped to include a spring portion and a tab joined thereto. The spring portions flex with respect to the base member. The tabs on the pair of elbow members are arranged adjacent to one another and oriented to extend in a substantially common direction to be received in a common hole in the support frame. The tabs extend outward from the spring portions and have recesses for gripping the support frame.

Optionally, the spring portions bias the tabs outward away from one another such that the tabs securely grip opposed sides of the common hole in which the tabs are received.

In another embodiment, a universal bracket capable of mounting an electrical component to support frames with different hole patterns is provided. The bracket includes a base member, a support joined to the base member, and tabs formed on the support that extend outward to provide recesses for gripping the frames. The tabs have a predetermined height dimensioned to fit into each of the hole patterns. The tabs are arranged about the support in line with one another and separated from one another by an inter-tab spacing that is dimensioned to align the tabs with corresponding holes in each of the hole patterns.

Optionally, the bracket can include an additional support that is also joined to the base member with tabs formed on the support that extend outward providing recesses for gripping the frames. The tabs of the added support are sized and arranged such that each tab may be received by a hole of a support frame with one tab from the other support.

BRIEF DESCRIPTION OF THE DRAWINGS

FIG. 5 illustrates one support frame that may be used with the bracket shown in FIG. 3.

FIG. 6 illustrates another support frame that may be used with the bracket shown in FIG. 3.

DETAILED DESCRIPTION OF THE INVENTION

Figure 1:
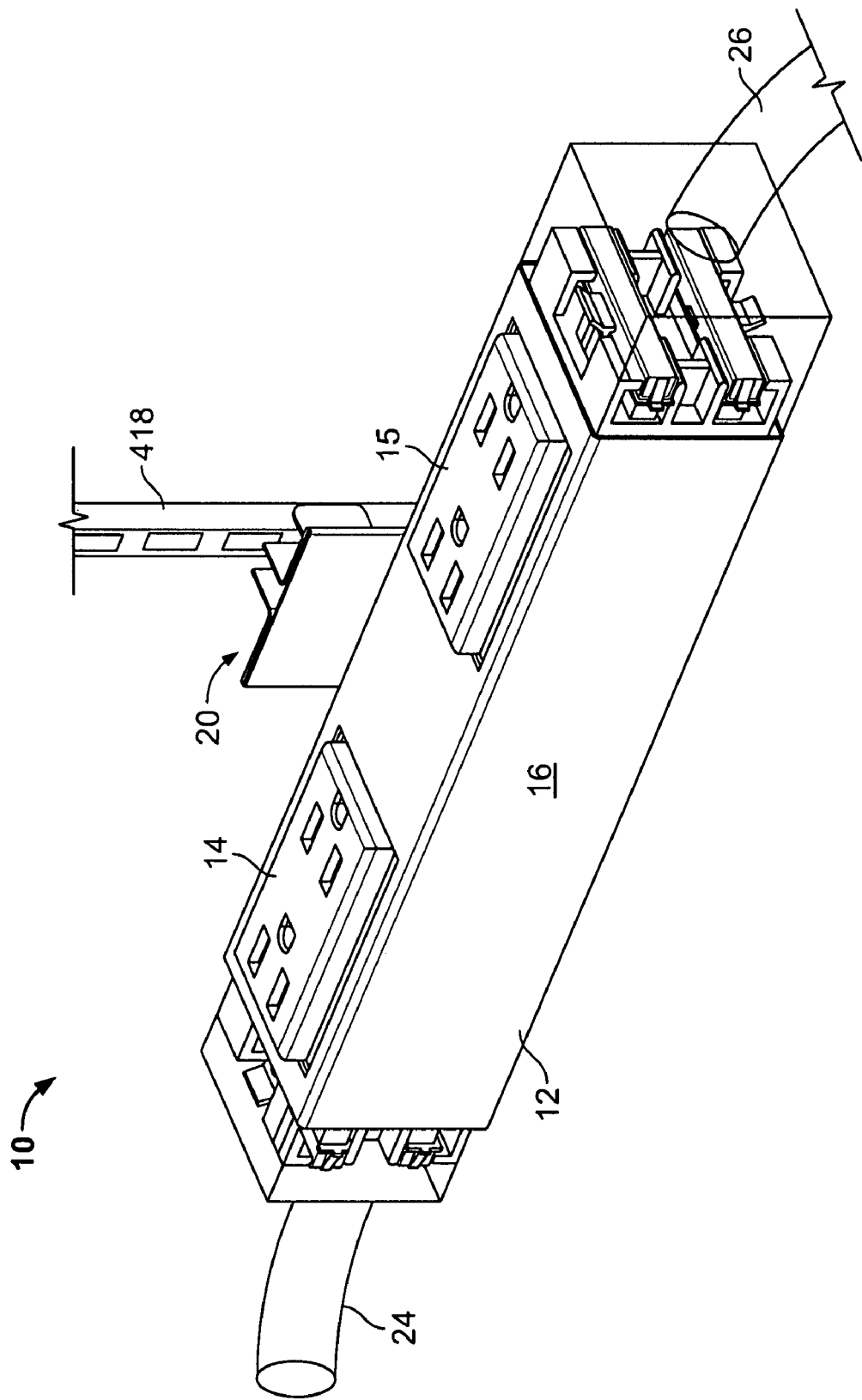
FIG. 1 is a perspective view of an electrical component support assembly using a bracket formed in accordance with an embodiment of the present invention.

FIG. 1 illustrates an electrical component support assembly 10 that includes an electrical component 12 secured to a support frame 418 via a bracket 20. The electrical component 12 may be a power strip having a housing 16 that holds one or more receptacle outlets 14 and 15 which are connected to cables 24 and 26, respectively. Although electrical component 12 is a power strip in FIG. 1, alternatively, a variety of electrical components (e.g., speakers or security camera) may be removably attached to bracket 20. Moreover, embodiments of the present invention are not limited to supporting electrical components, but may also support apparatuses that are not electrical. For example, embodiments of the present invention may be used to secure a shelf unit that can hold merchandise, a basket for holding other items, or a fire extinguisher. Also, embodiments of the present invention could be integrally formed with the apparatus. For examples, the shelves could be formed or shaped to include a bracket similar to the bracket described below.

As will be described in further detail below, electrical component 12 is removably attached to bracket 20, which includes tabs 140, 142, 144, and 146 with recesses 160, 162, 164, and 166, respectively (shown in FIG. 2). Tabs 140, 142, 144, and 146 are inserted through frame holes to engage or grip support frame 418.

Figure 2:
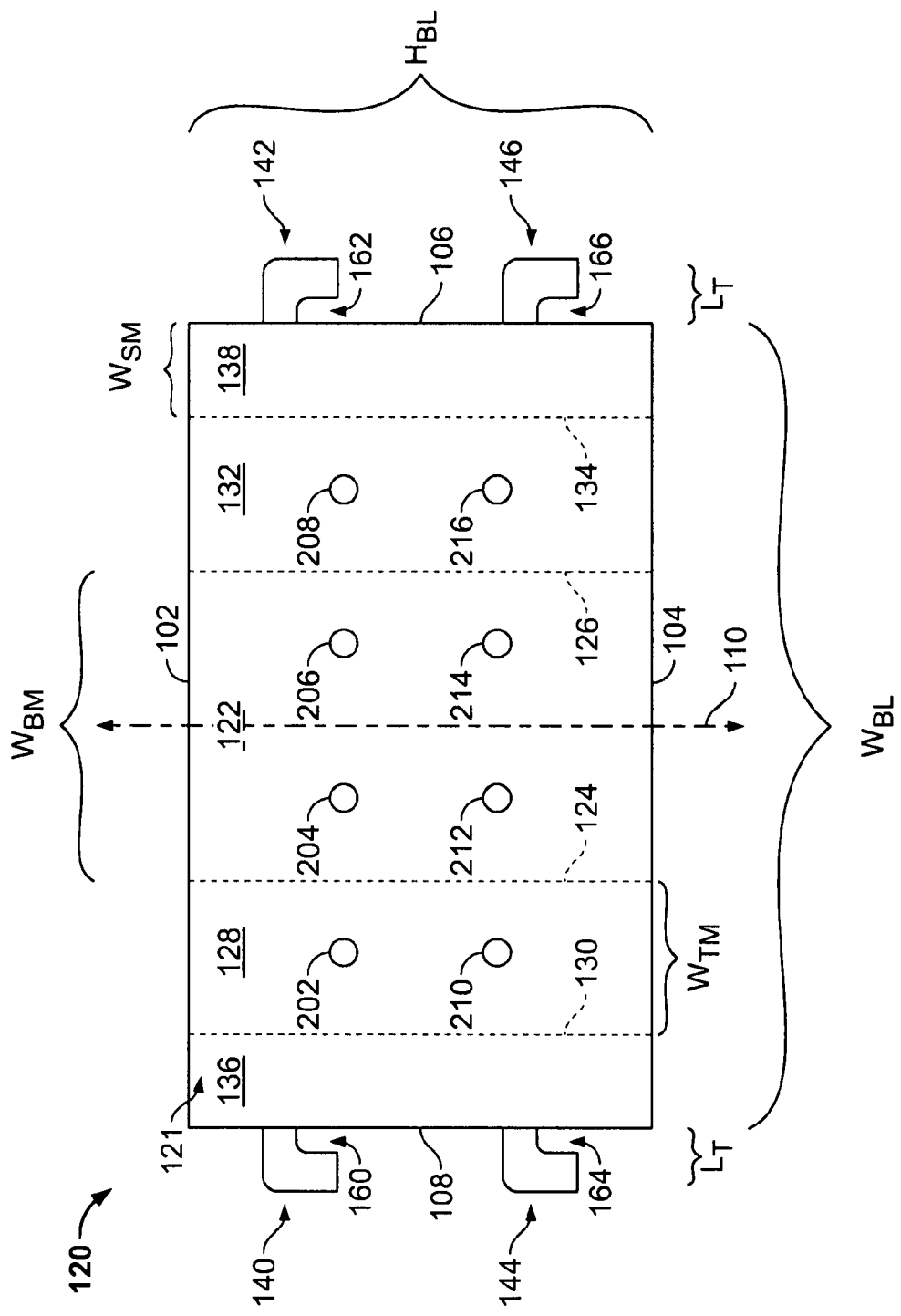
FIG. 2 is a planar view of a blank of sheet material stamped to form the bracket shown in FIG. 1.

FIG. 2 is a planar view of a blank sheet of material 120 that may be used to form bracket 20. Blank 120 may be any resilient material capable of being shaped or formed into a bracket that can mount a device onto support frame 418. By way of example, the material can be a metal alloy (e.g., 1010 or 1015 carbon steel), plastic, or any combination thereof. Although thin paper could not provide the proper support for electrical component 12, in some embodiments, the material could be corrugated paperboard infused with an adhesive or plastic-like material. Blank 120 may be stamped, pressed, or cut from the resilient material using known manufacturing means.

Blank 120 has a front side 121 and a backside (not shown). In one embodiment, blank 120 has a plurality of side-by-side sections that include a base member 122, two transition members 128 and 132 on opposite ends of base member 122, and two supports 136 and 138 on opposite ends of blank 120. Blank 120 may be substantially rectangular and include edges 102, 104, 106, and 108. Alternatively, blank 120 may have other shapes or fewer/more sections that are used in forming bracket 20 as discussed more fully below. Base member 122 is defined between section lines 124 and 126. Transition member 128 is defined between section line 124 and fold line 130. Transition member 132 is defined between section line 126 and fold line 134. Support 136 is defined between fold line 130 and edge 108. Support 138 is defined between fold line 134 and edge 106. Each of the supports 136 and 138 includes at least one tab projecting outwardly from the support. As illustrated in FIG. 2, tabs 140 and 144 extend from support 136 and each includes a recess 160, 164, respectively. Likewise, tabs 142 and 146 extend from support 138 and each include a recess 162, 166, respectively. As can be seen in FIG. 2, tabs 140 and 144 have a symmetrical relationship with tabs 142 and 146 about a vertical axis 110 that extends through the middle of blank 120. Although FIG. 2 illustrates two tabs projecting from each support, alternative embodiments may include only one tab or more than two tabs projecting from each support. Moreover, in the illustrated embodiment, tabs 140, 144, 142, and 146 are stamped from the same blank sheet as their respective support. However, other embodiments may have separate tabs that are coupled to their respective support.

The dimensions of blank 120 are configured to form a bracket capable of supporting an apparatus or electrical component while gripping a support frame. In some embodiments, blank 120 has a height $H_{BL}$ that ranges from about 80 mm to about 100 mm. In one embodiment, $H_{BL}$ is about 90 mm. Blank 120 may also have a width $W_{BL}$ that ranges from about 110 mm to about 140 mm. In one embodiment, $W_{BL}$ is about 128 mm.

Blank 120 can include a plurality of openings for allowing a fastening device to secure electrical component 12 to bracket 20. In one embodiment, base member 122 includes four openings 204, 206, 212, and 214. In some embodiments, vertical axis 110 divides the openings evenly onto two sides of axis 110. In one embodiment, openings 204 and 212 form a symmetrical relationship with respect to openings 206 and 214 about axis 110. Although blank 120 may have openings placed in other positions, the embodiment in FIG. 2 illustrates openings 204, 212, 206, and 216 as four corners of a rectangle.

In one embodiment, transition member 128 is folded or bent with respect to base member 122 along section line 124. For example, transition member 128 may be folded 180° such that transition member 128 and support 136 lie against a portion of base member 122. Support 136 is then folded or bent outward with respect to base member 122. In one embodiment, support 136 is substantially perpendicular to transition member 128 forming an elbow member, such as elbow member 242 shown in FIG. 3. Likewise, transition member 132 may be folded or bent 180° such that transition member 132 and support 138 lie against a portion of base member 122. Support 138 is then folded or bent outward with respect to base member 122. In one embodiment, support 138 is substantially perpendicular to transition member 132 forming an elbow member, such as elbow member 240 shown in FIG. 3.

Supports 136, 138, transition members 128, 132, and base member 122 may have any dimensions that are suitable for forming the elbow member. For example, supports 136 and 138 may have a width $W_{SM}$ that ranges from about 10 mm to about 20 mm. In one embodiment, $W_{SM}$ is about 15 mm. Transition members 128 and 132 may have a width $W_{TM}$ that ranges from about 18 mm to about 30 mm. In one embodiment, $W_{TM}$ is about 23 mm. Base member may have a $W_{BM}$ that ranges from about 40 mm to about 70 mm. In one embodiment, $W_{BM}$ is about 50 mm. Further, tabs 140, 144, 142, and 144 may each have a length $L_T$ that projects from the edge of blank 120. In some embodiments, $L_T$ is from about 10 mm to about 15 mm. In one embodiment, $L_T$ is about 13 mm.

Figure 3:
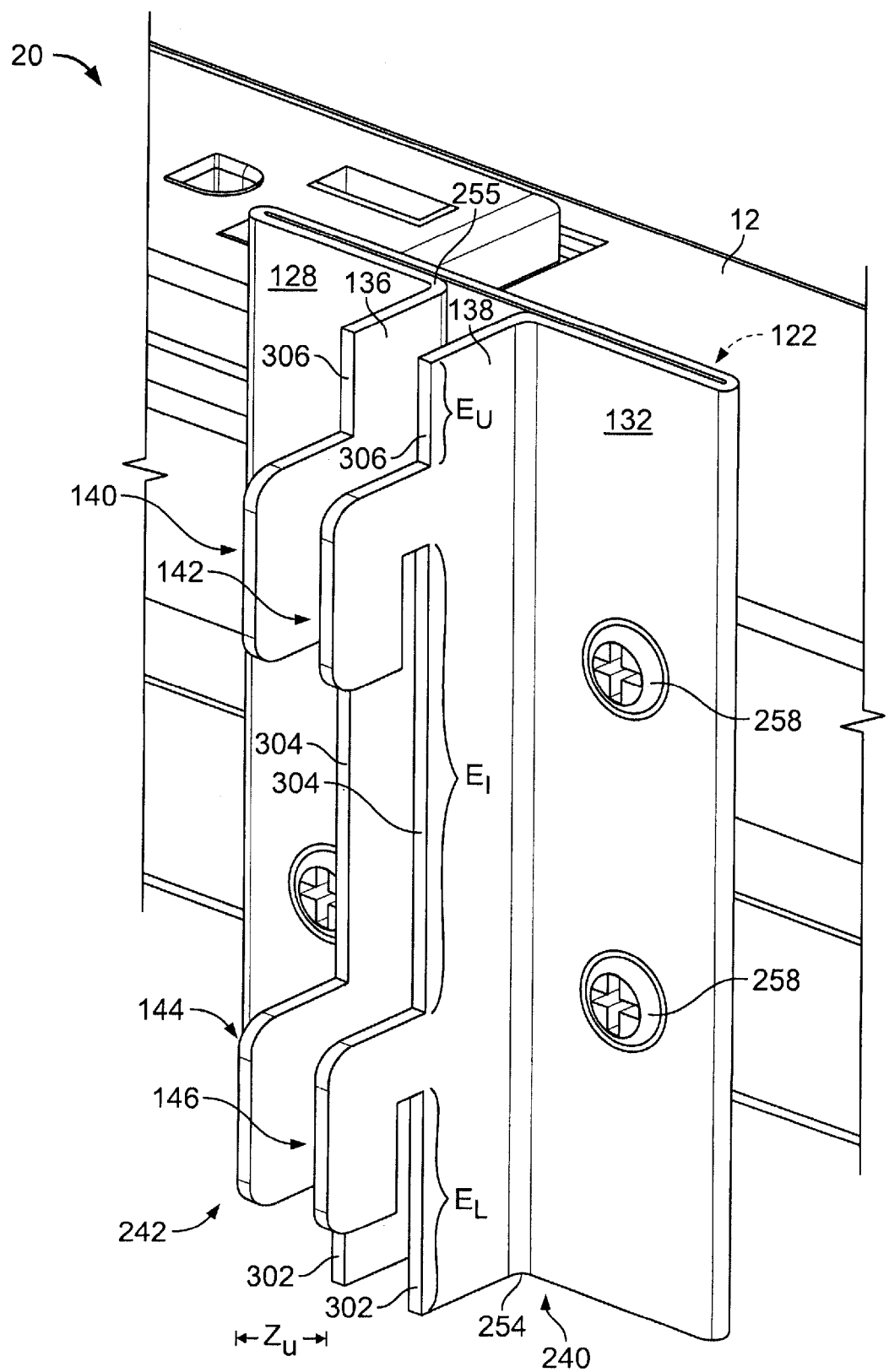
FIG. 3 is a perspective view of a bracket formed in accordance with an embodiment of the present invention.

If transition members 128 and 132 overlap base member 122, such as the embodiment shown in FIG. 3, then transition members 128 and 132 may also include openings that overlap openings 204, 212, 206, and 214 on base member 122. As shown in FIG. 2, transition member 128 includes openings 202 and 210. Openings 202 and 210 are positioned to have a symmetrical relationship with base member openings 204 and 212, respectively, with section line 124 as the axis between. As such, when transition member 128 is folded onto a portion of base member 122, opening 202 overlaps opening 204 and opening 210 overlaps opening 212 such that the openings of each pair are concentrically aligned. Likewise, transition member 132 includes openings 208 and 216. Openings 208 and 216 are positioned to have a symmetrical relationship with base member openings 206 and 214, respectively, with section line 126 as the axis between. When transition member 132 is folded onto a portion of base member 122, opening 208 overlaps opening 206 and opening 216 overlaps opening 214 such that the openings of each pair are concentrically aligned.

In one embodiment, overlapping openings 202, 204, 206, 208, 210, 212, 214, and 216 form a square of openings (not shown) for fastening devices 258 (e.g., screws shown in FIG. 3). This shape enables a user of bracket 20 to manipulate the orientation of electrical component 12 while providing sufficient support for electrical component 12. For example, FIG. 3 illustrates electrical component 12 in a horizontal orientation. However, a user may remove the screws, rotate electrical component 12 to have a vertical orientation, and then mount electrical component 12 back onto the support frame using the same screw holes (not shown) of component 12 that were used to hold component 12 in the horizontal orientation. Although openings 202-216 form a square when formed into bracket 20, alternative embodiments may have other configurations. For example, each side may only have an opening for one screw which could still allow a user to manipulate the orientation of electrical component 12.

FIG. 3 illustrates a perspective view of one embodiment of a bracket 20 formed from a blank sheet of material, such as blank 120 discussed above. Bracket 20 includes base member 122 coupled to a pair of elbow members 240 and 242. Elbow member 240 includes transition member 132 that is located proximate to a portion of base member 122, support 138 that projects outwardly with respect to transition member 132, and a spring portion 254 that joins transition member 132 and support 138. Spring portion 254 has a curved shape enabling elbow member 240 to flex slightly. Elbow member 242 has a similar shape as elbow member 240 and includes transition member 128 that is located proximate to a portion of base member 122, support 136 that projects outwardly with respect to transition member 128, and a spring portion 255 that joins transition member 128 and support 136. Spring portion 255 has a curved shape enabling elbow member 242 to flex slightly.

Supports 136 and 138 extend from spring portions 255 and 254, respectively, in a substantially common direction (i.e., away from base member 122). Each of the supports 136, 138, includes one pair of tabs 140, 144, and 142, 146, respectively. As will be discussed further below, the flexing of elbow members 240 and 242 facilitates inserting the tabs of bracket 20 into frame holes (shown in FIGS. 7 and 8) and engaging the edges of the frame holes to provide additional support for bracket 20 and electrical component 12.

In the illustrated embodiment, transition member 132, support 138, and spring portion 254 of elbow member 240 are formed from the same sheet of material. Also, transition member 128, support 136, and spring portion 255 of elbow member 242 are formed from the same sheet of material. However, alternative embodiments may have separate parts that are coupled together to have the same shape and flexibility of elbow member 240 or 242. Moreover, although the illustrated embodiment shows bracket 20 made from one sheet of material, alternative embodiments may be formed from separate parts. For example, bracket 20 may have three separate parts, elbow members 240 and 242 and base member 122, that are secured together by fastening devices 258.

As shown in FIG. 3, in one embodiment, when bracket 20 is not engaged with support frame 418, supports 136 and 138 and their corresponding tabs 140, 144 and 142, 146, respectively, are a predetermined distance $Z_u$ apart. Generally, distance $Z_u$ is determined by the width of the frame holes which tabs 140 and 142 and tabs 144 and 146 will be inserted through. In some embodiments, $Z_u$ is from about 5 mm to about 10 mm.

Figure 4:
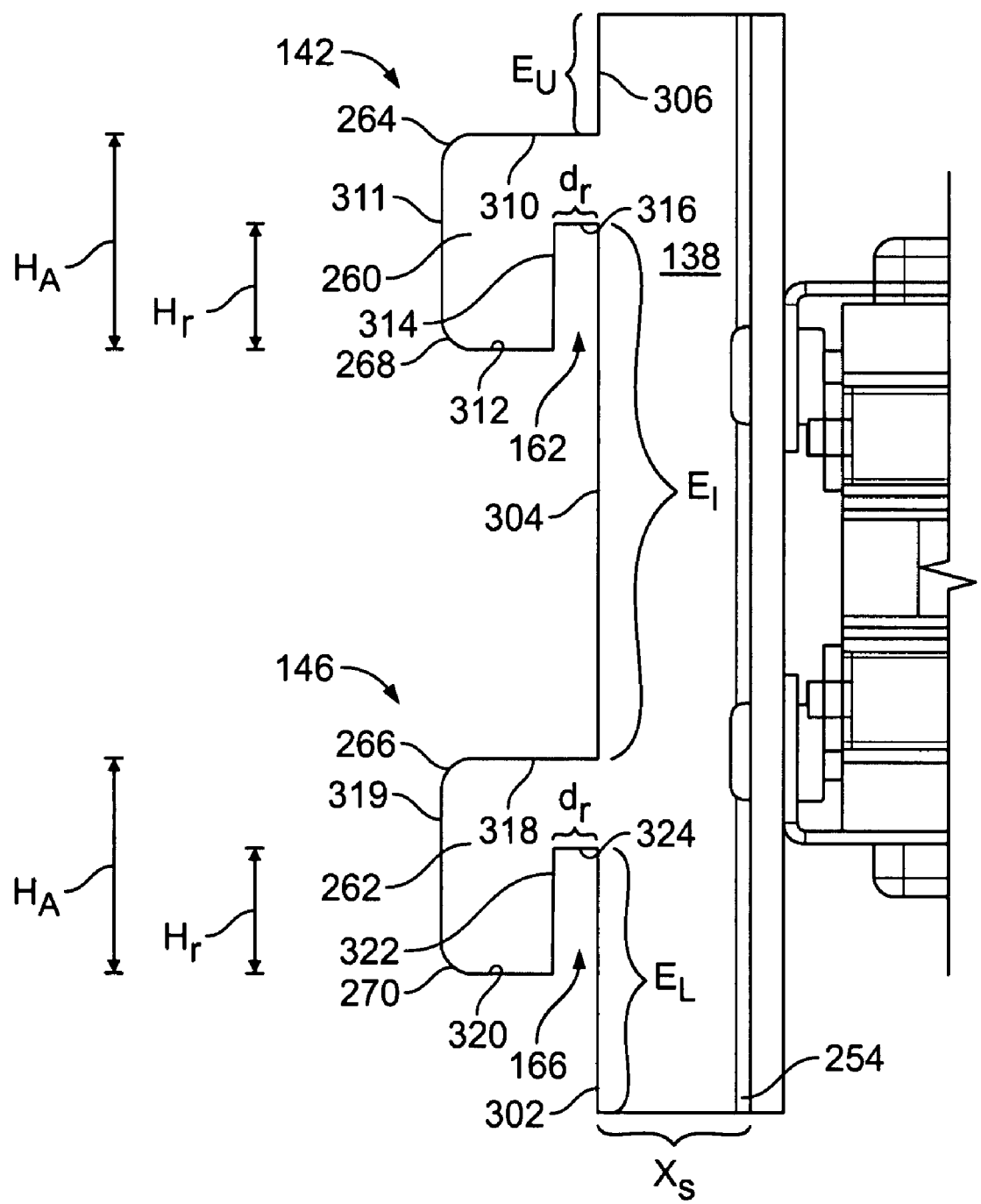
FIG. 4 is a side view of the bracket shown in FIG. 3.

FIG. 4 is a side view of bracket 20 and illustrates the characteristics and parts of support 138 and tabs 142 and 146. Although support 136 is not shown, support 136 and tabs 140 and 144 have similar characteristics and parts as shown in FIG. 4. Support 138 extends a distance $x_s$ from spring portion 254. By extending a distance $x_s$ from spring portion 254, support 138 provides more torque for the flexing of spring portion 254, thereby facilitating the lateral movement of tabs 142 and 146. Moreover, distance $x_s$ provides a gap between support frame 418 and transition members 128, 132, which helps a user in reaching behind electrical component 12 to grip bracket 20 while trying to mount or remove bracket 20.

FIGS. 3 and 4 both illustrate engagement edges 302, 304, and 306. More specifically, support 138 includes lower engagement edge 302 that stretches from the bottom of support 138 to a connecting edge 324 of tab 146, inter-engagement edge 304 that stretches from an upper edge 318 of tab 146 to a connecting edge 316 of tab 142, and upper engagement edge 306 that stretches from an upper edge 310 of tab 142 to a top of support 138. Lower engagement edge 302 has a length $E_L$, inter-engagement edge 304 has a length $E_I$, and upper engagement edge 306 has a length $E_U$. Engagement edges 302, 304, and 306 facilitate mounting bracket 20 by providing a positive stop when inserting tabs 142 and 146 into their respective frame holes. When bracket 20 is mounted onto support frame 418, engagement edges 302, 304, and 306 also provide support to bracket 20 by directly contacting an outer surface 419 of support frame 418 (shown in FIG. 8).

As shown in FIG. 4, tabs 142 and 146 each include recess 162, 166, respectively, for gripping or engaging a centerline portion 421, 423, respectively (shown in FIG. 5). In one embodiment, tab 142 is substantially L-shaped and includes upper edge 310, an upper tip 264, an arm edge 311, a lower tip 268, a lower edge 312, an inner edge 314, and connecting edge 316. Tips 264 and 268 may each have a curved shape to facilitate directing tab 142 into the respective frame hole. Tab 146 can have a similar L-shape as that of tab 142 and may also include upper edge 318, an upper tip 266, an arm edge 319, a lower tip 270, a lower edge 320, an inner edge 322, and connecting edge 324. Edges 316 and 324 stretch a distance $d_r$ from engagement edge 304 and 302, respectively. Moreover, tab 142 has a height $H_A$ that stretches between upper edge 310 and lower edge 312, and tab 146 also has a height $H_A$ that stretches between upper edge 318 and lower edge 320. Height $H_A$ is generally determined by the size of the holes in the respective frame. In one embodiment, $H_A$ is from about 10 mm to about 25 mm. Also, although FIG. 4 illustrates tab 142 and tab 146 as having a similar size and shape, tabs 142 and 146 may have different sizes and shapes provided that tabs 142 and 146 can fit through their respective frame holes and provide a suitable recess for engaging centerline portion 421, 423, respectively.

Edges 310, 311, 312, and 314 circumscribe an arm 260 of tab 142. Similarly, edges 318, 319, 320, and 322 circumscribe an arm 262 of tab 146. Arms 260 and 262 hang downward and parallel to support 138 thereby forming recesses 162, 166, respectively. In one embodiment, recess 162 has a height $H_R$ and is defined by inner edge 314, connecting edge 316, and engagement edge 304. Similarly, recess 166 has a height $H_r$ and is defined by inner edge 322, connecting edge 324, and engagement edge 302.

In one embodiment, tabs 142 and 146 share the same plane as support 138. Alternatively, support 138 may form an angle with tabs 142 and 146. By way of example, support 136 (not shown in FIG. 4) and support 138 may extend from spring portions 254, 255, respectively, at a slight inward angle toward each other. Tabs 142, 146 of support 138 and tabs 140, 144 of support 136 may then project from their respective supports at an angle such that adjacent tabs 140 and 142 and adjacent tabs 144 and 146 are substantially parallel to each other. Such an embodiment would still provide flexibility for elbow members 240 and 242.

FIGS. 5 and 6 illustrate support frames 418 and 518, respectively. As shown in FIG. 5, support frame 418 has a front plate 429 and sidewalls 428, 430. Optionally, support frame 418 may have a rear plate or sidewall (not shown). Support frame 418 also has a series of vertically aligned holes 420, 422, 424, and 426. Centerline portions 421, 423, and 425 extend between holes 420 and 422, 422 and 424, and 424 and 426, respectively. Each centerline portion has a length 432 that stretches between the holes. Moreover, each hole may be substantially rectangular and have a height 434 and width 436. Similarly, support frame 518 has a front plate 529 and sidewalls 528, 530. Optionally, support frame 518 may have a rear plate or sidewall (not shown). Support frame 518 also has a series of vertically aligned holes 520, 522, 524, and 526. Centerline portions 521, 523, and 525 extend between holes 520 and 522, 522 and 524, and 524 and 526, respectively. Each centerline portion has a length 532 that stretches between the holes. Moreover, each hole may be substantially rectangular and have a height 534 and width 536. Although the holes for support frames 418 and 518 are substantially rectangular, the holes may have other shapes that are suitable for receiving tabs 140-146 to support bracket 20.

In one embodiment, bracket 20 is a universal bracket such that bracket 20 is sized and shaped to tolerate different hole patterns from different support frames, such as support frames 418 and 518. For example, bracket 20 can be configured to tolerate the difference between length 432 and length 532. Moreover, tabs 140-146 of bracket 20 can be sized and shaped to be received by holes that have varying shapes and dimensions.

Figure 7:
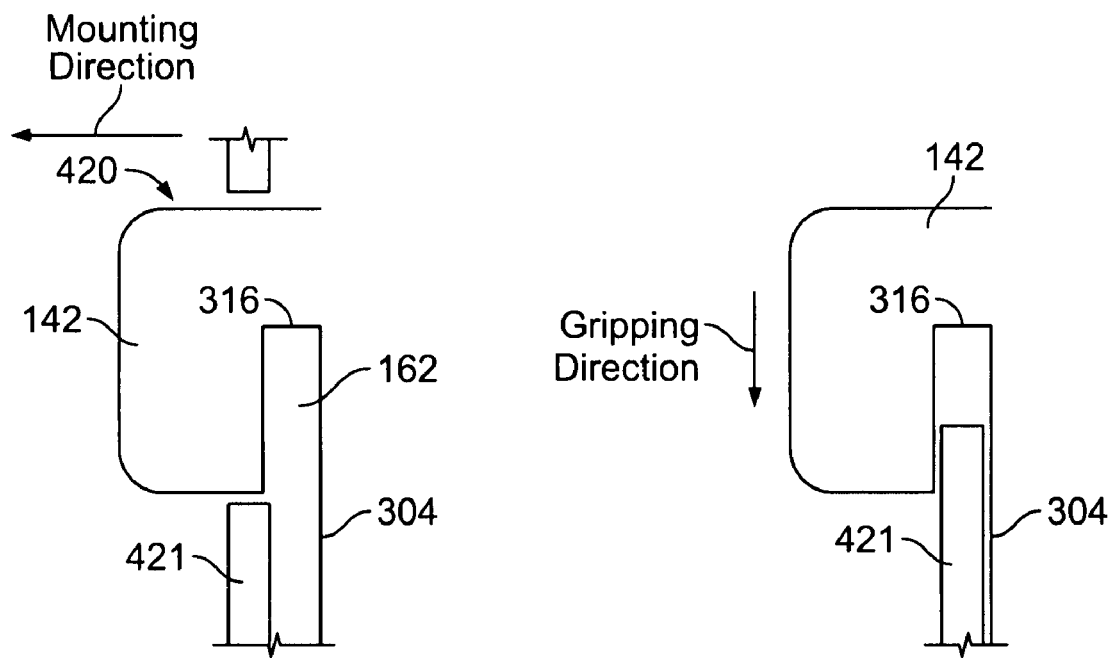
FIG. 7 illustrates the process of mounting the bracket shown in FIG. 3 onto the support frame shown in FIG. 5.

FIG. 7 illustrates the mounting of a portion of bracket 20 onto support frame 418. Specifically, tab 142 is moved in a mounting direction so that tab 142 is inserted through hole 420. Engagement edge 304 provide a positive stop for bracket 20. Bracket 20 is then lowered in a gripping direction such that connecting edge 316 moves toward centerline portion 421. As shown more clearly in FIG. 8, bracket 20 receives a centerline portion 421 into recess 162.

Figure 8:
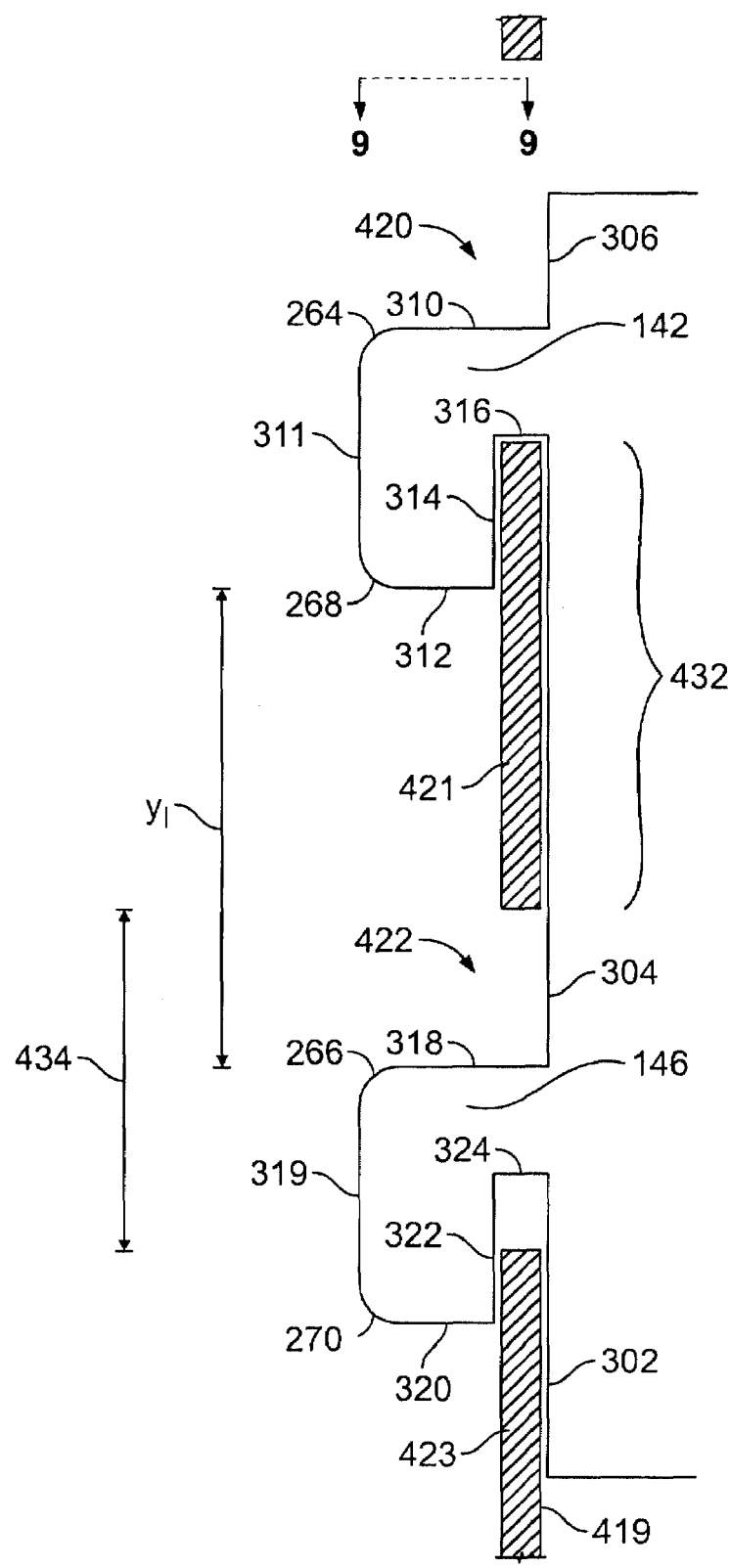
FIG. 8 is a side cross-sectional view of the bracket shown in FIG. 3 as the bracket engages the support frame shown in FIG. 5.

FIG. 8 is a side cross-sectional view of bracket 20 engaging support frame 418 (shown in FIG. 1). As discussed above, although tabs 140-146 are in fixed positions with respect to supports 136 and 138, bracket 20 is capable of coupling to one support frame having a predetermined distance between frame holes and also coupling to another support frame that has a different predetermined distance between frame holes. As illustrated in FIG. 8, an inter-tab spacing $y_I$ stretches between upper edge 318 of tab 146 and lower edge 312 of tab 142. As long as tab height $H_A$ is shorter than the height 434 of the corresponding hole, and inter-tab spacing $y_I$ is less than the length 432 of centerline portion 421, bracket 20 can engage and grip support frame 418.

Figure 9:
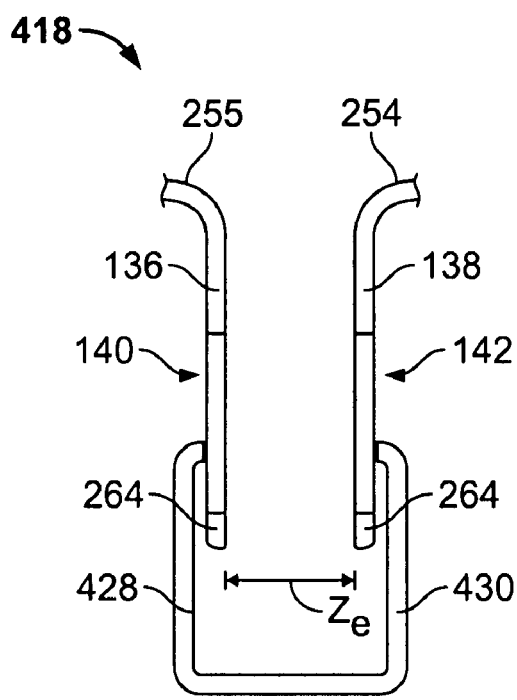
FIG. 9 is a top cross-sectional view of the bracket shown in FIG. 8.

FIG. 9 is a top cross-sectional view of bracket 20 taken along line 9-9 in FIG. 8. As discussed above, the resilient material of blank 120 enables spring portions 254 and 255 to flex with respect to base member 122 causing tabs 142 and 146 to move laterally inward. When engaged with support frame 418, a space having a width $Z_e$ separates tips 264 of laterally adjacent tabs 140 and 142. In one embodiment, width $Z_e$ is slightly less than width $Z_u$ shown in FIG. 3. In this flexed position, tabs 140 and 142 provide a deflective force against a portion of sidewalls 428 and 430, respectively, of support frame 418, which strengthens the grip that bracket 20 has on frame 418.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A bracket for mounting an electrical component to a support frame, the bracket comprising:
a base member having a substantially planar shape and including first and second sides, the first side being configured to couple to the electrical component; and
a pair of elbow members located proximate to the second side of the base member and configured to be mounted to a support frame, each of the elbow members being shaped to comprise a transition member, a tab, and a spring portion that joins the tab and the transition member, the transition members of the elbow members extending along the second side toward one another to locate the spring portions adjacent to one another, the spring portions flexing with respect to the base member, the tabs on the pair of elbow members being arranged adjacent to one another and oriented to extend in a substantially common direction away from the base member to be mounted to the support frame, the tabs extending outward from the spring portions and having recesses for gripping the support frame.

2. The bracket in accordance with claim 1 wherein the spring portions bias the tabs outward away from one another such that the tabs securely grip opposed sides of a common hole of the support frame in which the tabs are received.

3. The bracket in accordance with claim 1 wherein the bracket is formed from a common blank of sheet material such that the tabs, spring portions, transition members, and base member are integral with one another, the base member being defined between two fold lines, each transition member sharing a corresponding fold line with the base member and being folded back along the corresponding fold line so that the transition members extend toward each other.

4. The bracket in accordance with claim 1 wherein the elbow members further comprise supports positioned between and joining respective spring portions and tabs, the supports extending the tabs a predetermined distance from the base member.

5. The bracket in accordance with claim 4 wherein the tabs and the supports extend along a common plane.

6. The bracket in accordance with claim 4 wherein the predetermined distance extended by the supports is configured to facilitate a user gripping the bracket to remove or mount the bracket to the support frame.

7. The bracket in accordance with claim 1 wherein each elbow member comprises at least two tabs joined to the spring portion, each tab having a recess to mount to the support frame.

8. The bracket in accordance with claim 1 further comprising at least one opening extending through at least one transition member and the base member, the at least one opening configured to receive a fastening device for securing the corresponding transition member, the base member, and the electrical component together.

9. The bracket in accordance with claim 1 wherein the first and second sides extend between two edges that define a width of the base member, the tabs being spaced apart from each other a predetermined distance along the width of the base member, the predetermined distance being less than the width of the base member.

10. The bracket in accordance with claim 1 wherein each transition member directly abuts the second side of the base member.

11. The bracket in accordance with claim 1 wherein the spring portion has a curved shape.

12. A support assembly for supporting an apparatus, the support assembly comprising:
an apparatus;
a bracket removably attached to the apparatus, the bracket comprising:
a base member having a substantially planar shape including two edges and first and second sides that extend therebetween, the two edges separated by a width of the base member, the first side configured to couple to the apparatus; and
a pair of elbow members located proximate to the second side of the base member and configured to be mounted to a support frame, each of the elbow members being shaped to comprise a spring portion and a tab joined thereto, the spring portions flexing with respect to the base member, the tabs on the pair of elbow members being arranged adjacent to one another and oriented to extend in a substantially common direction to be mounted to a support frame, the tabs being spaced apart from each other a predetermined distance, wherein the predetermined distance is measured along and is less than the width of the base member, the tabs extending outward from the spring portions and having recesses for gripping the support frame when inserted into the hole.

13. The support assembly in accordance with claim 12 wherein the spring portions bias the tabs outward away from one another such that the tabs securely grip opposed sides of a common hole of the support frame in which the tabs are received.

14. The support assembly in accordance with claim 12 wherein the bracket is formed from a common blank of sheet material such that the tabs, spring portions, and base member are integral with one another, the base member extending between two fold lines that define the edges of the base member, each elbow member extending from a corresponding fold line and folded back along the corresponding fold line so that the elbow members extend toward each other.

15. The support assembly in accordance with claim 12 wherein the elbow members further comprise supports positioned between and joining respective spring portions and tabs, the supports extending the tabs a predetermined distance from the base member.

16. The support assembly in accordance with claim 15 wherein the tabs and the supports extend along a common plane.

17. The support assembly in accordance with claim 12 wherein each elbow member comprises at least two tabs joined to the spring portion, each tab having a recess to mount to the support frame.

18. The support assembly in accordance with claim 12 wherein the bracket comprises at least one opening for securing the bracket to the apparatus.

19. The support assembly in accordance with claim 12 wherein the spring portion has a curved shape.

20. A support assembly for supporting an apparatus, the support assembly comprising:
an apparatus;
a bracket removably attached to the apparatus, the bracket comprising:
a base member having a substantially planar shape including two edges and first and second sides that extend therebetween, the two edges separated by a width of the base member, the first side configured to couple to the apparatus; and
a pair of elbow members located proximate to the second side of the base member and configured to be mounted to a support frame, each of the elbow members being shaped to comprise a spring portion and a tab joined thereto, the spring portions flexing with respect to the base member, the tabs on the pair of elbow members being arranged adjacent to one another and oriented to extend in a substantially common direction to be mounted to a support frame, the tabs being spaced apart from each other a predetermined distance, wherein the predetermined distance is measured along and is less than the width of the base member, the tabs extending outward from the spring portions and having recesses for gripping the support frame when inserted into the hole; and
wherein the bracket comprises a plurality of openings for securing the bracket to the apparatus, each opening extending through one of the elbow members and the base member and configured to receive a fastening device to secure the elbow member, the base member, and the apparatus together.

* * * * *